United States Patent [19]
Shulz et al.

[11] 3,818,819
[45] June 25, 1974

[54] PRESSURE COOKING SYSTEM

[75] Inventors: Robert J. Shulz, Brookfield; Orest A. Kozinczuk, Chicago, both of Ill.

[73] Assignee: Innovative Process Equipment Inc., Palatine, Ill.

[22] Filed: May 15, 1972

[21] Appl. No.: 253,409

[52] U.S. Cl............ 99/330, 99/370, 126/369, 219/401, 126/20
[51] Int. Cl............ A47j 27/08, A23l 3/16
[58] Field of Search ............ 99/330, 370; 122/501; 126/348, 369, 377, 379, 350, 380, 20; 137/386, 392, 487.5, 624.11, 624.18; 219/327, 333, 401, 492–493, 284; 237/67; 239/597, 598

[56] References Cited
UNITED STATES PATENTS

| | | | |
|---|---|---|---|
| 1,955,289 | 4/1934 | Greenfield | 99/370 X |
| 2,472,970 | 6/1949 | Hanna | 99/370 |
| 3,077,530 | 2/1963 | Chase et al. | 126/369 X |
| 3,342,423 | 9/1967 | Hruby et al. | 239/598 |
| 3,495,071 | 2/1970 | Niles | 126/369 X |

Primary Examiner—Billy J. Wilhite
Assistant Examiner—Arthur O. Henderson
Attorney, Agent, or Firm—Edmond T. Patnaude

[57] ABSTRACT

A pressure cooking system employs an electrolytic steam generator which is energized only during a cooking cycle and drained and flushed at the end of each cooking cycle, a thermostatically controlled drain valve, and a water inlet control to the generator whereby low pressure steam is used to defrost frozen food placed in the cooking compartment and high pressure steam thereafter used to cook the food.

7 Claims, 2 Drawing Figures

PATENTED JUN 25 1974 3,818,819

PRESSURE COOKING SYSTEM

The present invention relates in general to pressure cookers of the type wherein steam is supplied from an external source to the cooking compartment and it relates more particularly to new and improved system particularly suited for rapidly thawing and cooking frozen foods in mass feeding applications.

BACKGROUND OF THE INVENTION

Several pressure cookers designed for use in restaurants and institutions are known in the prior art and supply live steam to the cooking compartment to thaw frozen food and then to cook or heat it. In one such cooker, dry steam is fed directly onto the food product for rapid thawing, and the compartment is kept open to the atmosphere until the pressure therein increases to a small predetermined value. Other known cookers employ a time delay mechanism for sealing the compartment only after a fixed period commencing with the supply of steam to the cooker. These prior art cookers have been marketed with steam generators which are continuously energized to supply steam to the cooking compartment whenever a cooking cycle is initiated. We have found that such generators have a relatively short operating life because of the salts which are deposited therein by the water as it evaporates into steam.

OBJECTS OF THE INVENTION

Therefore, one subject of the present invention is to provide a new and improved system wherein the steam generator is operated only when a demand for steam occurs.

Another object of this invention is to provide a steam generator and cooking system wherein the generator is flushed out after each cooking cycle to minimize the depositing of ionic salts therein.

Another problem frequently occurring in the prior art cooking systems has been the extensive maintenance required to keep the steam generators functioning properly, and a further object of the present invention is, therefore, to provide an improved and simplified control system for a steam generator making it particularly suited for use in combination with a pressure cooker to enable the use of low pressure steam during the thawing process and higher pressure steam during the cooking process.

In addition to the above mentioned objects, a still further object of this invention is to provide a new and improved pressure cooking system.

A still further object of this invention is to provide means for effecting rapid thawing of frozen food without directing the incoming steam directly onto the frozen food thereby to reduce the amount of condensation in the pans containing the food.

SUMMARY OF THE INVENTION

Briefly, a pressure cooking system embodying the present invention employs an electrolytic steam generator supplied with water at the beginning of a cooking cycle and drained and flushed at the end of each cycle. Steam is fed to the cooking compartment through nozzles which direct sheets of steam across the top of the pans to educt the air from around the food to enable rapid heat transfer to the food and to minimize condensation in the pans. A thermostat mounted in the cooking compartment automatically closes the drain valve at the bottom of the compartment to seal the chamber when the temperature therein has risen to a predetermined value. In accordance with another aspect of the invention, water is applied to the generator at a sufficiently low flow rate to permit gradual heating of the water when the generator is initially energized thereby to prevent overflow of the generator where, for example, the water has low conductivity. Also, the supply of water to the generator is responsive to the current flow in the electrodes and a time delay is provided between the demand for steam and the supply of water to the generator chamber to prevent over flow of the generator.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE DRAWING

Figures 1, 2:
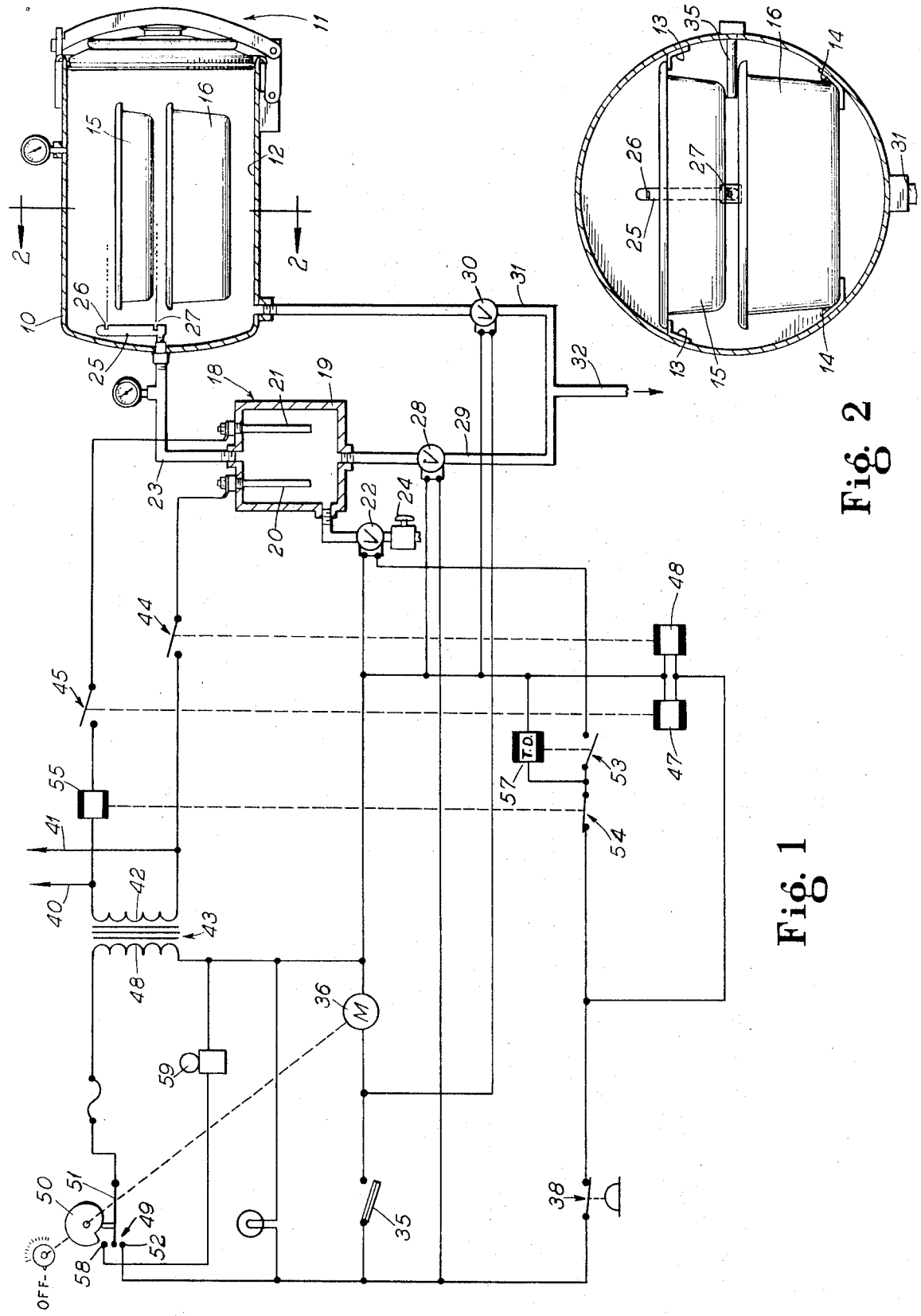
FIG. 1 is a schematic diagram of a preferred embodiment of the pressure cooking system of the present invention.
FIG. 2 is a sectional view taken along the line 2—2 of FIG. 1 showing the disposition of the steam nozzles in the cooking compartment.

Referring now to the drawing, a vessel 10 and a pressure tight door assembly 11 define a generally cylindrical cooking compartment 12 including upper and lower pairs of tracks 13 and 14 for slidably supporting a set of pans 15 and 16 for holding the food to be prepared. The door mechanism may be of any suitable type but is preferably like that disclosed in U.S. Pat. application Ser. No. 231,250, filed Mar. 2, 1972 and assigned to the same assignee as is the present application. In use the door 11 is swung outwardly of the compartment 12 for inserting and removing the pans.

In order to supply pressurized steam to the cooking compartment 12 there is provided an electrolytic type steam generator 18 including a pressure housing 19 in which a plurality of electrodes 20 and 21 are mounted. Water is supplied to the steam chamber within the housing 19 through a water inlet line including a normally closed solenoid valve 22, and steam is supplied to the cooking compartment through a steam line 23. A manually adjustable flow control valve 24 is provided in the water inlet line to the generator to enable control of the flow of water to the generator in accordance with the conductivity thereof and the characteristics of the generator. For example, in those areas where the water is hard, a high flow rate can be tolerated inasmuch as high current flow therethrough occurs. Hence, as hard water enters the generator, current almost immediately flows between the electrodes which, as explained hereinafter, is used to close the valve 22 when such current exceeds a predetermined value. On the other hand, where the water is soft it is desirable to employ a lower inlet rate to permit the water to warm up, which increases the conductivity thereof, so that sufficient current flows between the electrodes before the generator is full to enable control of the water inlet valve 22. Once the proper flow rate for the water in a particular locality has been determined, a non-adjustable flow control orifice of the proper size may be substituted for the adjustable valve 24.

The line 23 is coupled through the rear wall of the vessel 10 to a vertically disposed nozzle member 25 having a pair of spray orifices 26 and 27 for directing steam across the tops of the pans 15 and 16. The nozzle member 25 is tubular having a closed upper end, and the orifices 26 and 27 are inwardly opening horizontal slots which respectively direct a flat, fan shaped spray pattern across the top of the associated pan to educt the air from the pans at the beginning of a cooking cycle to promote rapid heat transfer to the food. During the cooking cycle whenever steam is demanded, the flat spray pattern educts the cooled gases from the pans to maintain circulation of the gaseous heating medium around the food without impinging the fresh steam directly onto the food. The fresh steam thus travels a circuitous path through the cooking compartment before being drawn into the pans thus minimizing the condensation of steam in the pans.

A solenoid operated drain valve 28 is connected in a drain line 29 connected to the bottom of the generator 18, and another solenoid operated drain valve 30 is connected in a drain line 31 connected to the bottom of the vessel 10. The drain lines 29 and 31 are connected together downstream of the valves 28 and 30 and connected through a common drain line 32.

In use, food to be prepared is placed in the pans 15 and 16 which are then inserted in the cooking vessel and the door 11 is then sealably closed. As described in greater detail hereinafter, a timer is set to the required cooking period whereupon the water inlet valve 22 opens to supply water to the pressure chamber in the generator and the generator drain valve 28 closes. The generator electrodes 20 and 21 are connected across a voltage source whereby current flows between the electrodes through the water to heat and vaporize it thereby to supply steam to the cooking compartment. When the temperature in the rear of the cooking compartment reaches a temperature of about 220° F, a condition which occurs when frozen food initially placed in the pans has been substantially defrosted, and is sensed by a thermostat 35 mounted therein, the drain valve 30 closes to completely seal the cooking compartment from the atmosphere, and a timer motor 36 is energized to time out the previously set cooking period. During the cooking period the pressure in the compartment is controlled by a pressure responsive switch 38 which deenergizes the electrodes and interrupts the supply of water to the generator by closing the water inlet valve 22 when the compartment pressure exceeds a predetermined value of about 15 p.s.i. At the end of the cooking period the water inlet valve 22 is closed and the drain valves 28 and 30 are opened to terminate the supply of steam to the cooking temperature, to drain and flush the generator, to drain the water collected in the bottom of the cooking compartment and to exhaust the steam therefrom. The door assembly 11 may then be opened and the pans 15 and 16 removed.

Considering the control circuit in greater detail, a pair of power busses 40 and 41 are connected across the primary winding 42 of a transformer 43. A pair of normally open sets of contacts 44 and 45 on a pair of power relays having solenoids 46 and 47 are respectively connected between the busses 40 and 41 and the generator electrodes 20 and 21. The solenoids 46 and 47 are connected in parallel between one terminal of a secondary winding 48 of the transformer 43 and to the other terminal thereof through the normally closed contacts of the pressure switch 38 and a double pole single throw switch 49 operated through a cam 50 by the timer motor 36. When the timer is in the off position as shown, the switch arm 51 is in an intermediate, non-switching position. When, however, the timer is set to a timing position, the switch arm makes contact with the lower contact 52 to energize the solenoids 46 and 47 to close the contacts 44 and 45 and thus energize the generator electrodes 20 and 21. In addition, the solenoid of the drain valve 28 is energized to close the valve 28.

The solenoid of the water inlet valve 22 is connected at one end to the lower terminal of the transformer secondary winding 48 and is connected at the other end to the timer switch contact 52 through a set of normally open contacts 53 of a two second time delay relay 57, a set of normally closed contacts 54 of a current relay having a coil 55 serially connected with the generator electrode 21, and the normally closed contacts of the pressure switch 38. The coil of the time delay relay 57 is serially connected with the pressure switch contacts 38 and the current relay contacts 54 through the timer switch across the transformer winding 48 and picks up two seconds after being energized thereby to open the water inlet valve 22. During a cooking cycle whenever the current relay contacts 54 open due to an excessive current flow through the electrodes, the valve 22 closes. Also, when the contacts 38 open, the valve 22 closes and the contactors 44 and 45 open. When the contacts 38 again close, there is a brief time delay to permit the contacts 46 and 47 to close before the water is supplied to the generator thereby to prevent the supply of water to the generator before the electrodes are energized.

When the temperature in the cooking compartment initially reaches 220° F near the beginning of the cycle, the thermostat switch 35 closes to energize the timer motor 36 and to energize and thus close the cooking compartment drain valve 30. Pressure and temperature then rapidly build up in the compartment to cook the product contained in the pans.

When the cooking period set on the timer has been timed out, the timer switch arm 51 moves out of engagement with the contact 52 to de-energize the steam generator and the solenoids of the valves 22, 28 and 30 whereby the water inlet valve 22 closes, and the outlet valves 28 and 30 open to drain both the generator 18 and the cooking compartment 12. At this time the switch arm 51 moves up into engagement with a contact 58 to energize a suitable alarm 59 signifying the end of the cooking cycle.

When the generator drain valve 28 opens, the steam pressure in the generator and in the cooking compartment rapidly forces the water out of the generator and steam flows through the generator over the surface of the electrodes to remove any salts which may have been deposited thereon. Such flushing of the generator after each cooking cycle minimizes the detrimental build up of salts on the electrodes.

An additional advantage obtained by draining the generator at the completion of each cooking cycle is that when a cooking cycle is commenced, steam is initially supplied to the cooking compartment at a relatively low pressure compared to the pressure provided during the overall cooking period. Since better defrosting is achieved with low pressure low temperature steam, a better final product results. In practice a pressure of about 5 p.s.i. during the defrosting period and a pressure of 15 p.s.i. during the cooking period has provided good results with those types of frozen foods, such as peas, which are easily overcooked.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A pressure cooking system comprising
a sealable cooking chamber,
a steam generator having a water inlet, a steam outlet at the top and a drain outlet at the bottom,
means connecting said steam outlet to said cooking chamber,
a first valve connected between said water inlet and a source of water,
a second valve connected between said drain outlet and a drain line,
control means for said generator and said valves, and
manually settable timing means for connecting a source of electricity to said control means for a period of time controlled by said timing means to automatically open said second valve to drain said generator upon termination of said period of time.

2. A pressure cooking system according to claim 1, further comprising
a chamber drain outlet at the bottom of said cooking chamber,
a third valve connected between said chamber drain outlet and a drain line, and
said control means being operatively connected to said third valve for opening said second and third valves upon termination of said period of time.

3. A pressure cooking system according to claim 2 wherein
said steam generator is of the electrolytic type.

4. A pressure cooking system according to claim 1 wherein
said steam generator is of the electrolytic type.

5. A pressure cooking system comprising
a sealable cooking chamber,
a steam generator having a water inlet, a steam outlet at the top and a drain outlet at the bottom,
means connecting said steam outlet to said cooking chamber,
a first valve connected between said water inlet and a source of water,
a second valve connected between said drain outlet and a drain line,
control means for said generator and said valves,
manually settable timing means for connecting a source of electricity to said control means for a period of time controlled by said timing means to automatically open said second valve to drain said generator upon termination of said period of time, a chamber drain outlet at the bottom of said cooking chamber,
a third valve connected between said chamber drain outlet and a drain line,
said control means being operatively connected to said third valve for opening said second and third valves upon termination of said period of time,
wherein said generator comprises a plurality of electrodes, and
a relay having a pickup coil serially connected with one of said electrodes and a set of contacts serially connected with said first valve for opening said contacts and closing said first valve when the current through said one of said electrodes exceeds a predetermined value thereby to control the supply of water to said generator in response to the current therethrough.

6. A pressure cooking system according to claim 5 comprising
a flow regulator connected in the water inlet line to said generator.

7. A pressure cooking system according to claim 5 comprising
switch means responsive to the pressure in said cooking chamber for de-energizing said electrodes and for closing said first valve when said pressure exceeds a predetermined amount, and
time delay means maintaining said first valve closed until said electrodes are energized.

* * * * *